United States Patent [19]

Hadzimihalis

[11] 3,885,868

[45] May 27, 1975

[54] CONVERTIBLE PROJECTOR WITH DOOR ACTUATED MIRROR

[75] Inventor: Theodore M. Hadzimihalis, Libertyville, Ill.

[73] Assignee: Bell & Howell Company, Chicago, Ill.

[22] Filed: Mar. 29, 1974

[21] Appl. No.: 456,327

[52] U.S. Cl. .................. 353/71; 353/78; 353/99
[51] Int. Cl. .................. G03b 21/28; G03b 21/30
[58] Field of Search .................. 353/71, 72, 74–78, 353/98, 99, 119

[56] References Cited
UNITED STATES PATENTS

| | | | |
|---|---|---|---|
| 3,234,848 | 2/1966 | Stoothoff | 353/72 |
| 3,807,847 | 4/1974 | Okano | 353/71 |

*Primary Examiner*—Richard E. Aegerter
*Assistant Examiner*—A. J. Mirabito
*Attorney, Agent, or Firm*—John E. Peele, Jr.

[57] ABSTRACT

Disclosed is a film image projection apparatus convertible for projection of an image onto a remote surface or onto a screen built into the housing of the apparatus. A door for selectively blocking the projection path is coupled to a mirror which is selectively positionable in the projection path to pass the projected image to the remote screen when the door is open or to deflect the projected image to mirrors within the housing to ultimately project the image onto the screen built into the housing when the door is closed.

2 Claims, 4 Drawing Figures

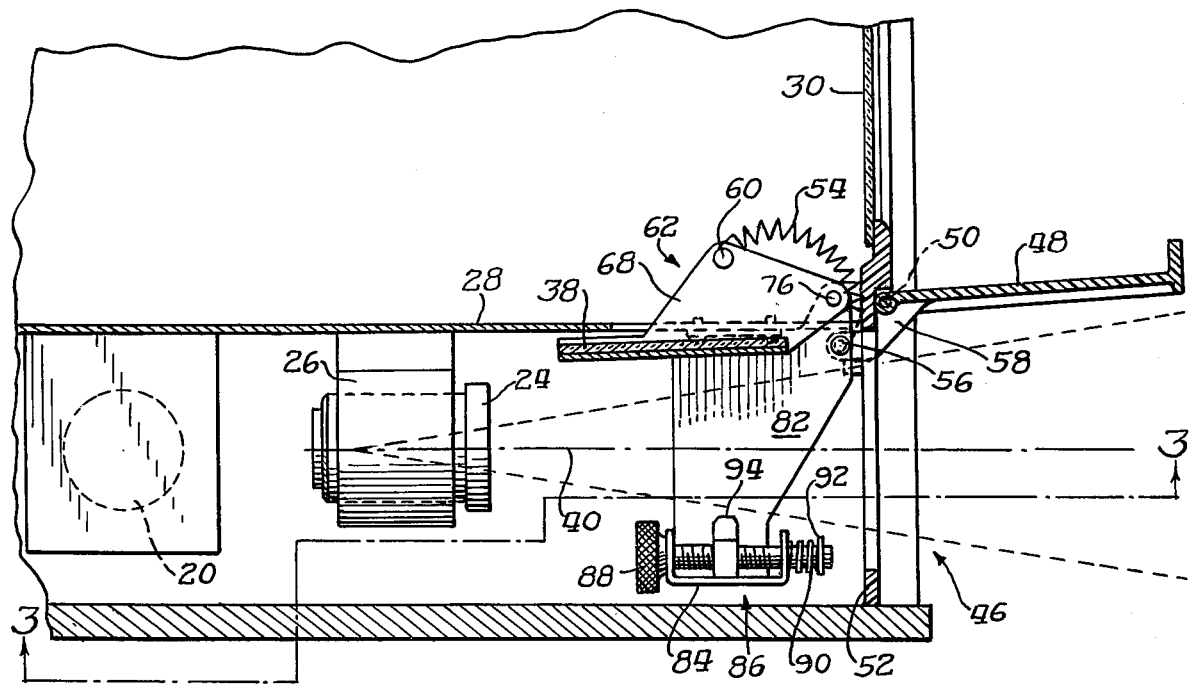
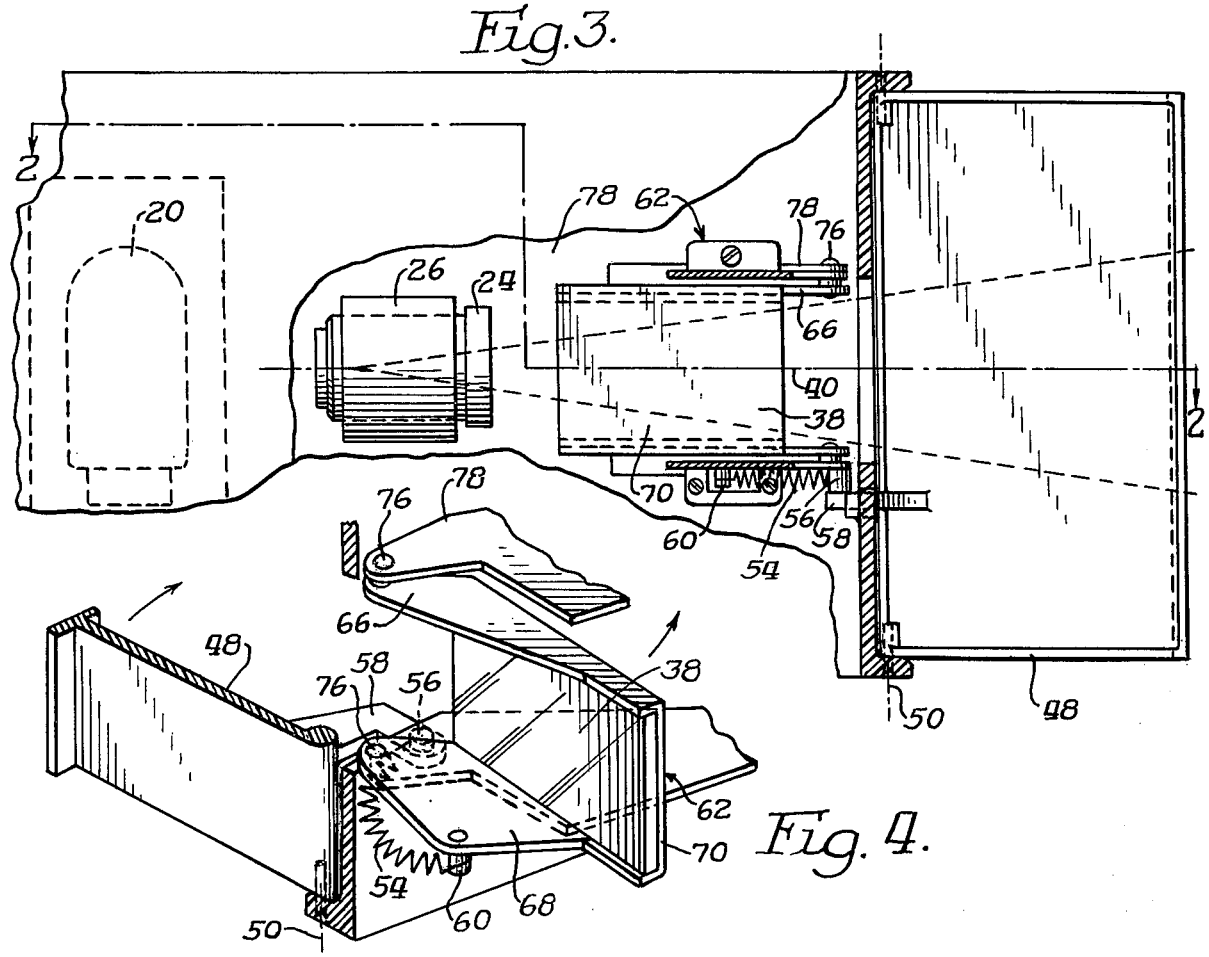

CONVERTIBLE PROJECTOR WITH DOOR ACTUATED MIRROR

The present invention relates to an image projection apparatus and more particularly to a mechanism associated with the housing and optical path of the apparatus for enabling selective projection of images from film onto either a remote viewing surface or a built-in screen.

Various designs of motion picture and still projectors, convertible for projection of images onto remote and built-in surfaces are known. However, few of these designs have achieved substantial commercial success since several manual operations were usually required to convert the projector from remote projection to at-the-unit viewing. Further, these projectors are generally bulkier, heavier, and more expensive than comparable single purpose units. Attempts to combine the projectors have resulted in compromises with the images on the built-in screen being smaller than desirable and often the remotely projected image being of less brilliance than is desirable.

The present invention provides an arrangement for overcoming the shortcomings of the known constructions by providing an interconnected door and mirror, selectively postionable for either deflecting the projected image onto the built-in screen or permitting normal projection onto a remote screen. The apparatus of this preferred embodiment is a motion picture projector having known functions controlled by mechanism built into a housing. In the front side of the housing is arranged a screen onto which an internally reflected image may be projected for viewing by the user and others close to the projector. Adjacent the built-in screen is located an opening aligned with the projection path and through which the projected image may pass to a remote surface. A cover door for the opening is coupled to a mirror displaceable into and out of the projection path in response to the operation of the door respectively to either deflect the projected image to the built-in screen or to pass the image to the remote surface. Thus, a unit is provided which can be converted from built-in to remote operation by positioning the door and re-focusing.

An object of the present invention is to provide a relatively compact projector enabling conversion of the apparatus for projection of an image onto either a remote surface or a built-in screen by adjusting the door of the projector housing.

Further and other objects will be apparent from the description of the accompanying drawings in which like numerals refer to like parts.

In the drawings:

FIG. 2 is a plan view of a portion of the optical path layout with the projection axis arranged for image projection onto a remote screen, taken along the line 2—2 of FIG. 3;

FIG. 3 is an elevational view of the optical path layout taken along line 3—3 of FIG. 2; and FIG. 4 is a perspective view of the image deflecting and door control mechanism.

Figure 1:
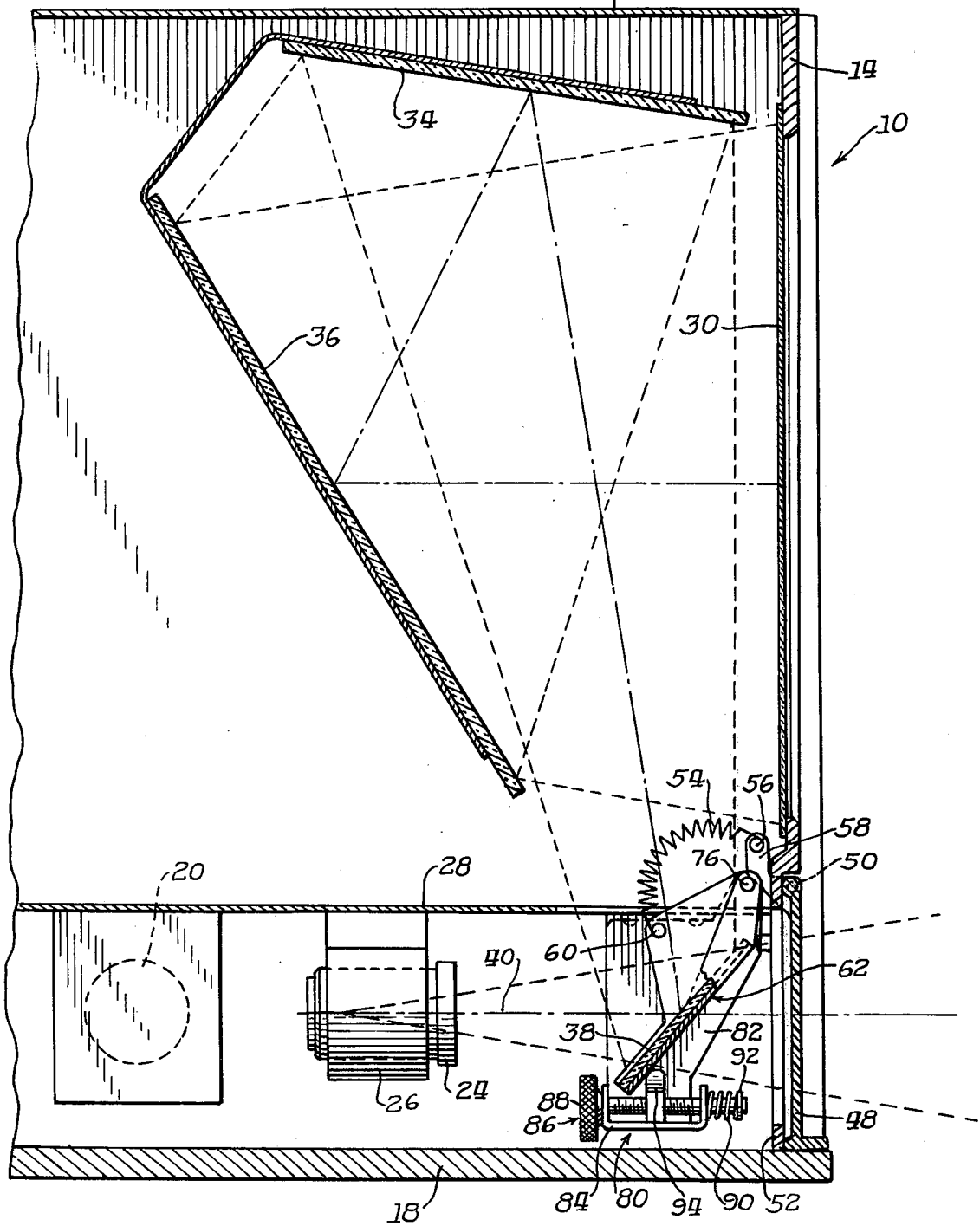
FIG. 1 is a partial plan view of the optical path layout of a projector incorporating the features of this invention, with the projection axis arranged for projection of the image onto the built-in screen.

Referring to the figures, there is shown a projector such as a motion picture projector 10 with a housing having wall portions including a front wall 14, and side walls 16, 18 respectively. A rear wall, top, and bottom wall are not shown but are understood to complete the housing and to provide a substantially enclosed and substantially dust proof container for the film handling and optical components of the projector. A projection lamp 20 is positioned internally and rearwardly of the housing. The projection lamp is arranged to illuminate frames of film (not shown) transported through a (not shown) projection station. These components are preferably aligned optically with the projection lens 24, which is adjustably positionable for focusing in a carrier 26 attached to a mechanism support plate 28. The aforementioned optical components are selected to project sufficiently enlarged and brilliant images onto either a viewing screen 30 built into the housing or a remote projection surface such as a screen (not shown).

Internally of the housing 10, a pair of fixedly positioned mirrors 34, 36 are arranged to deflect the projected image from the mirror 38 which is displaceable into and out of the projection path 40. When in the projection path, mirror 38 deflects the image at substantially 90° from the path toward mirror 34. This mirror 34 further deflects the image toward the built-in screen 30. These mirrors, preferably front surfaced, are oriented and dimensioned to provide a relatively large projected image on the rear surface of the screen within the confines of a relatively compact housing. The angles at which the mirrors are fixed permit the required enlarging of the projection path without cutting off any portion of the projected image.

The projection path to the remote surface passes through a projection aperture 46 aligned with the projection lens 24 in the front wall 14 of the housing. In this preferred embodiment, and as shown in FIG. 2, the projection aperture is open when a cover door 48 is open. The cover is hinged for pivotal movement from open to closed conditions about an axis 50 defined by hinge pins and pin receivers in the door and the housing. In the open condition, the door is inclined slightly beyond a right angle relative to the plane of the housing front wall 14. The overswing of the door is to clear the expanding optical path of the projected image as required for the projection path generated by the projection lens intended to be used. The closed condition of the cover is limited by an internal stop surface 52 forming a portion of the front wall.

To ensure positioning of the cover door 48 in either the open or the closed condition, an over-center spring 54 is connected to a lug 56 extending from an arm 58 fixed to the inner side of the door. The opposite end of the spring 54 is attached to a pin 60 fixed to a mirror support carrier assembly or frame 62 having upper and lower tab portions 66, 68 and an intermediate flat portion 70 against which the mirror 38 is fixed. A pair of aligned axles 76 in the upper and lower tab portions of the mirror carrier are mounted in support plates 78 of the housing to define an axis about which the mirror carrier is pivoted. By the action of the over-center spring 54, and the connector pin 56 coupling the mirror carrier and the door, the mirror is displaced between a projection path blocking or deflecting position as shown in FIGS. 1 and 3, and a projection path open position as shown in FIG. 2, when the door is in closed and open positions respectively. Further, the action of the over-center spring displaces the pivotably adjustable components to the maximum extent of their adjustable positions.

Referring again to FIG. 1, the mirror assembly 62 is seen to include an adjusting mechanism 80. A frame 82, fixed to the mechanism support plate 28 of the projector, carries a bracket 84 through which an adjusting screw 86 is threaded. On one end of the screw is formed an enlarged head 88 while about the opposite end thereof is arranged a coiled spring 90 held thereon by a spring retaining washer 92. Between the arms of the bracket, a mirror assembly adjusting slide 94 is threaded to the adjusting screw 86. Operation of the adjusting screw causes axial movement therealong of the adjusting slide so as to alter the angle of the mirror 38 about axis 76 and relative to the projection axis 40 to enable centering of the image on the built-in screen 30. The spring about the screw end maintains the positioning of the screw and therefore causes the adjusting slide 94 to maintain the adjusted angle of the mirror 38 between displacement to and from its alternate positions.

The foregoing description is illustrative of a preferred embodiment of the housing of a projector which is convertible for projection of the image onto a remote surface, and projection of the image onto a built-in screen. The conversion is accomplished by either opening or closing of a cover door which simultaneously causes displacement of a pivotable mirror to and from an image deflecting position in the optical path. When the door is closed, the adjustable mirror is oriented to deflect the image toward the mirrors within the housing and toward the screen. However, when the door is open, the adjustable mirror is oriented out of the optical path to permit projection of the image onto a remote surface.

What is claimed is:

1. In a film image projection apparatus convertible for projection of an image alternatively onto a remote surface and a built-in screen, the apparatus having projection means substantially enclosed within a housing and defining a projection path, the improvement comprising:

projection path blocking means adjustable about a first axis to open and closed positions, and being positioned substantially in a plane parallel with said built-in screen when in said closed position;

mirror means mounted for pivotable movement about an axis parallel to said blocking means supporting axis;

means coupling said blocking means and said mirror means for simultaneous displacement between projection path closed, image blocking condition and projection path open, image passing condition, said coupling means including:

over-center spring means for positive displacement of said blocking means and said mirror means from a first predetermined position;

adjustable means for orienting said mirror means when said blocking means is in said image path closed position; and limit means for determining one of said predetermined positions of said blocking means.

2. Apparatus as in claim 1 wherein said coupling means is coupled to said mirror means and said blocking means, and is spaced from said axes about which said mirror means and said blocking means pivot.

* * * * *